United States Patent [19]

Post

[11] Patent Number: 4,526,071

[45] Date of Patent: Jul. 2, 1985

[54] SCREWDRIVER AND JOINING DEVICE

[76] Inventor: Melvin Post, 7017 N. Laramie, Skokie, Ill. 60077

[21] Appl. No.: 93,207

[22] Filed: Nov. 13, 1979

Related U.S. Application Data

[63] Continuation of Ser. No. 897,591, Apr. 19, 1978, abandoned.

[51] Int. Cl.³ .................................................. B25B 15/00
[52] U.S. Cl. .................................... 81/451; 81/456; 81/458; 81/461; 411/407
[58] Field of Search ............ 145/50 A, 50 D, 50 DB, 145/52, 50 E; 85/45; 81/451, 456, 457, 458, 460, 461; 411/407

[56] References Cited

U.S. PATENT DOCUMENTS

| 66,585 | 7/1867 | Harvey | 145/50 D |
|---|---|---|---|
| 1,939,268 | 12/1933 | Krull | 81/458 |
| 2,745,304 | 5/1956 | Cornelius | 81/458 |
| 3,236,275 | 2/1966 | Smith | 81/460 |
| 4,025,140 | 5/1977 | Matys | 81/461 |
| 4,033,244 | 7/1977 | Jacobson | 81/451 |

FOREIGN PATENT DOCUMENTS

| 922550 | 3/1973 | Canada | 81/461 |
|---|---|---|---|
| 427471 | 8/1911 | France | 145/50 D |
| 13985 | of 1905 | United Kingdom | 145/50 D |
| 671087 | 4/1952 | United Kingdom | 81/461 |

*Primary Examiner*—Frederick R. Schmidt
*Assistant Examiner*—J. T. Zatarga
*Attorney, Agent, or Firm*—Allegretti, Newitt, Witcoff & McAndrews, Ltd.

[57] ABSTRACT

A tool in the nature of a screwdriver engageable with the end of a screw or other type of fastener, the implement and fastener being so arranged that, when engaged for use the hazard of inadvertent disengagement is reliably precluded.

7 Claims, 10 Drawing Figures

U.S. Patent  Jul. 2, 1985  4,526,071
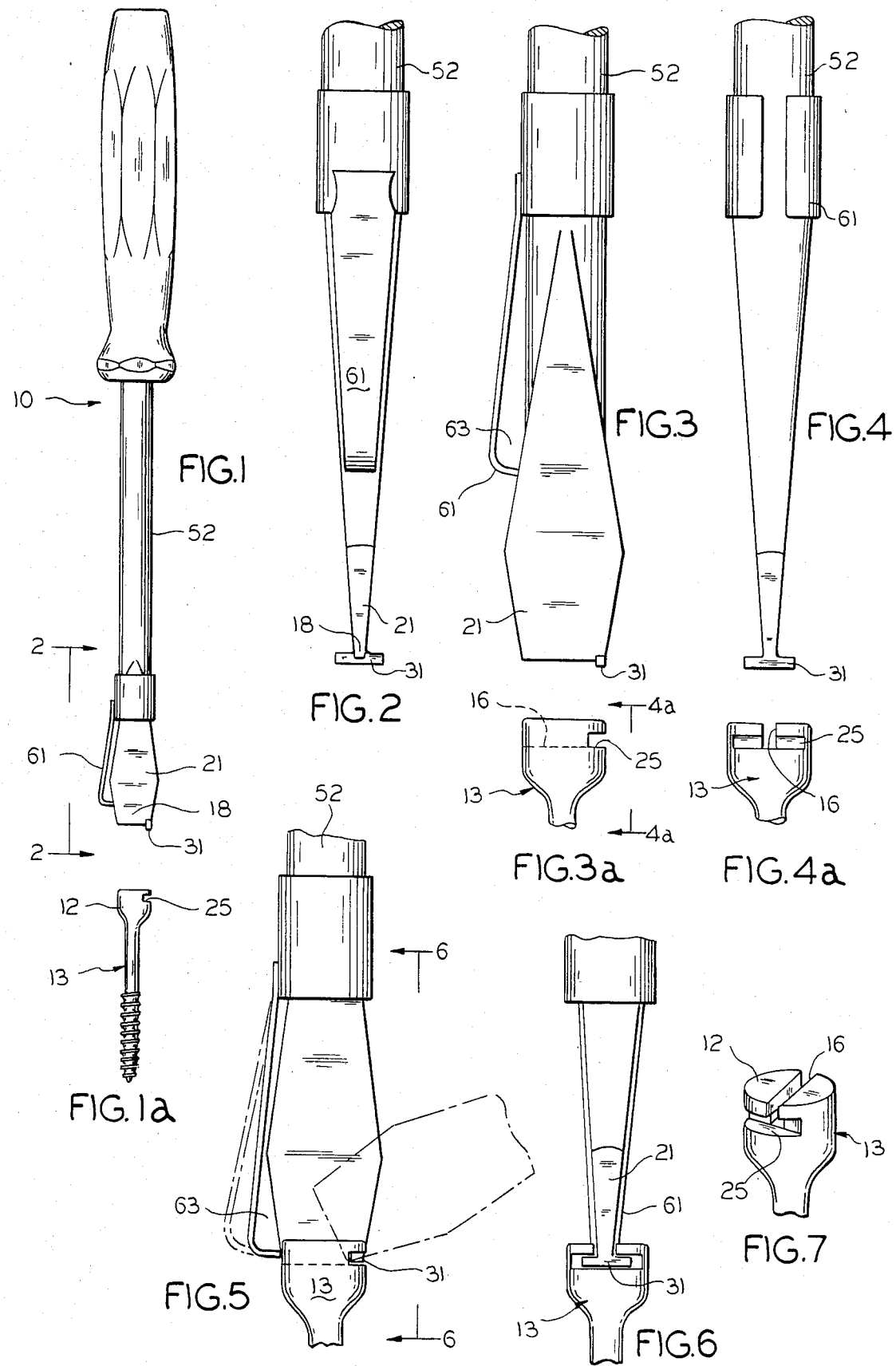

SCREWDRIVER AND JOINING DEVICE

This is a continuation of application Ser. No. 897,591 filed Apr. 19, 1978, now abandoned.

BACKGROUND OF THE INVENTION

In medicine and various other activities, but especially in orthopedic surgery, for example, various types of screws are driven into, and removed from bone. In such cases, absolute stability of the joined elements is a sine qua non. This factor dictates an absolutely stable engagement of the screwdriver with the fastener being driven. Where, herein, I refer to screws, it is intended to include studs, straight shank machine screws, of any thread form dictated by a particular application and with any desired shape of head, socket-head screws and studs, having in common some portion, e.g. a slot or recess with which the implement is engaged.

When working with bone structure a great deal of strength is often required. In inserting a screw in the terminus of a bone, the operator is often obliged to bear down with considerable force and, since it is frequently impossible to stabilize the body part with any degree of reliability, any shifting of what may be termed the "work piece" is to be avoided. Obviously, dislodgement of the screwdriver can be hazardous and thereby involve risk to the patient. Similar problems arise in those cases where the threads of the fastener are stripped and mismating is to be contended with.

Within the purview of the invention, the portion of the implement adapted to engage the driven element may be constructed to mate with screw heads of the socket type, e.g. the well-known Allen socket head screw, the Phillips type, and numerous others. In some of these cases adapters may be interposed.

Among the objects of the invention are:
1. Stability of the implement in relation to the driven part.
2. Precise placement of the screw in relationship to its hole, allowing rapid starting, driving and extraction of the fastening element.
3. Reliable engagement of the driving tool with the driven part.
4. Easier cleaning and sterilization of instruments and parts thereof.

SUMMARY OF THE INVENTION

The tool of the invention comprises a driving part including a handle designed to fit the operator's hand and capable of applying adequate rotational force to the driven element. In the interest of clarity and conciseness, the invention will be described as embodied in a tool for driving a screw provided with a slotted head although, as has been pointed out above, the nature of the parts being joined may vary widely.

In the exemplificative case, that part of the tool engaging the recess, e.g. a diametrical slot, resembles a conventional screwdriver blade and is adapted to engage in a diametrical slot disposed transversely of the head of the screw. Another slot in said end is offset laterally from the central axis of the driven part and at right angles to the first slot. Located at one end of the blade is an integral bit which projects from both faces of the blade some short distance and extends widthwise to the remote opposite ends of the blade. This feature leaves a substantial portion of the blade to be engaged by a screwdriver having a conventional blade. The bit is designed to be engaged in the second slot, with a slip fit. The blade and second slot are formed and dimensioned to be interengaged by first tilting the tool to preliminarily engage the bit within the transverse slot in the head of the screw and then be reversed to enable the blade to be situated fully within the first slot. The result is an interlocked union of the blade with the first slot.

In order to avoid inadvertent disengagement of the tool from its slot, a cantilever leaf spring may be mounted eccentrically on the shank of the tool to bear on an end portion of the blade. This spring has a turned-over end to apply concentrated force against the blade, thus to assure against slippage thereof and possible accidental disengagement.

Where, herein, I employ the term "edgewise", I intend to refer to that aspect of the tool as seen when viewed in the direction of a plane midway of the thickness of the blade.

BRIEF DESCRIPTION OF THE DRAWING

FIG. 1 is a side elevation of a tool embodying the principles of the invention;

FIG. 1a is a side elevation of a screw.

FIG. 2 is a side elevation taken in the direction of the arrows 2—2 of FIG. 1;

FIG. 3 is a partial side elevation of the tool of FIG. 2;

FIG. 3a is a side elevation of the head portion of the screw of FIG. 1;

FIG. 4 is an edgewise view of the tool as shown in FIG. 3 in its relation to the screw of FIG. 1;

FIG. 4a is a view taken in the direction of the arrows 4a—4a of FIG. 3a;

FIG. 5 is a side elevation of the tool and screw as engaged;

FIG. 6 is an elevation taken in the direction of the arrows 6—6 of FIG. 5; and

FIG. 7 is a perspective view of a typical screw of the kind with which the invention tool is adapted to cooperate.

In the figures some parts are fragmented in the interests of clarity and conciseness of description.

DESCRIPTION OF THE PREFERRED EMBODIMENT

Adverting to the drawing, I have shown, by way of example, a tool 10 embodying the principles of the invention and referred to, generally, as a screwdriver although, as has been pointed out above, this narrow description is intended to embrace other tools and fasteners capable of embodying the invention. It will also become apparent that the invention is capable of use with adapters, for example, such as may be interposed between the driver proper and the driven element, i.e. one having a slot to receive a conventionally-shaped screwdriver blade or other adapter capable of accepting the head 12 of a fastening element 13, (FIG. 1), e.g. an Allen head, Phillips head or equivalent. Assuming, for purposes of illustration, a screw fastener (FIG. 1) having a groove or diametral slot 16 (FIG. 7) located on a diameter of the cylindrical head 12, the driving end or blade 21 will be provided with a tip 18 of such thickness as to afford a close, but not jamming fit in the groove 16, comparably to a conventional screw-driver.

In order to preclude the tip 18 from slipping laterally in the direction of the groove 16, I also provide a second groove or chordal slot 25 (FIG. 7) perpendicular to the groove 16 and arranged to receive a bit 31 (FIGS. 6 and 7). Assembly or locking of the tip 18 of the blade is accomplished by tilting the bit 31 in its groove 25 (dot-dash lines in FIG. 5) and entering the blade 21 with a pivotal motion into its mating groove 25. Any tendency of the blade 21 to disengage in mutually perpendicular directions is opposed by reason of the two mutually intersecting slots 16 and 25 (FIG. 7). Although disengagement may occur as a result of angular misalignment of the blade with the central axis of the fastener 13, the eccentrically applied force necessary to correct this displacement is slight and may be easily neutralized to restore the axial alignment. To obtain this result, a spring clip 61 (FIG. 3) having a clasping action is snapped on the shank 52 of the tool and is so arranged as to apply a force radially of the central axis of the tool. The spring need not exert a very large force to function and may, therefore, be so tensioned as to permit dislodgement by means of a fingernail inserted in the space 63 (FIG. 3).

It will be understood that the operating clearance between the blade (including the bit 31) and their respective grooves 16 and 25 will be such in terms of clearances, as to allow the pivotal engaging and disengaging displacement thereof (FIG. 5).

Further, it will be understood that by reason of the hook-type engagement between the screw and the invention implement, withdrawal of the screw may be readily attained.

I claim:

1. In combination, a rotational driver and a threaded device to be engaged and driven by said rotational driver, the resistance to rotation of the threaded device being substantial, said threaded device having a head portion and a shank, the head portion provided with a diametrial slot in the top surface thereof, and chordal slot means in the side of the head portion and below the top surface thereof substantially at right angles to the diametral slot, the rotational driver having a shank with an elongated blade at one end, a projection at one side of the blade adjacent the free end of the blade and projection transversely of the blade at right angles to the blade, the blade adapted to engage in the diametral slot for drivingly rotating the threaded device and the projection adapted to engage in the chordal slot means for retaining the blade engaged with the threaded device during rotation in both directions.

2. The combination of claim 1 further characterized by the provision of a cantilever spring fixed to the shank of the rotation driver and having a free end bearing on the side of the blade opposite from the projection for helping retain a threaded device engaged with the rotational driver blade prior to use and to permit rapid disengagement of the rotational driver from the threaded device after the threaded device has been seated in place.

3. In combination a tool and a threaded fastener driven by said tool, said tool comprising handle means, a shaft extending from one side of said handle means to an end portion terminating in an elongated, flat, end surface, and a bar-shaped projection on one side of said flat, end surface and extending perpendicular thereto, and a biasing member mounted at one end by a slidable sleeve encircling said shaft, theother end of said biasing member having a curvature inward toward said elongated, flat, end surface, said biasing member being on the opposite side of said flat, end surface from said bar-shaped projection, said threaded fastener comprising a body portion having a threaded end portin and an elongated head portion, said head portion having a diametral slot in the top thereof to receive said elongated, flat, end surface of said tool and chordal slot means in said head portion positioned below the top surface of said head portion to receive said bar-shaped projection, said chordal slot means being perpendicular to said diametral slot, said inwardly curved portion of said biasing member contacting the circumference of said head portion diametrally from said chordal slot means.

4. In combination, a tool and a threaded fastener driven by said tool, said tool comprising handle means, a shaft extending from one side of said handle means to an end portion terminating in an elongated flat, end surface, and a bar-shaped projection on one side of said flat, end surface and extending perpendicular thereto, said threaded fastener comprising a body portion having a threaded end portion and an elongated head portion, said head portion having a diametral slot in the top surface thereof to receive said elongated, flat, end surface of said tool and chordal slot means in the side of said head portion positioned below the top surface of said head portion to receive said bar-shaped projection, said chordal slot means being perpendicular to said diametral slot.

5. The combination of claim 4 including a biasing member mounted on said shaft of said tool, said biasing member having a free end on the opposite side of the shaft from said bar-shaped projection, the free end of the biasing member contacting the surface of said head portion diametrally from said chordal slot means.

6. An elongated device for joining two elements together comprising a body portion, a threaded end portion, and a head portion having a diametral slot in the top surface thereof to receive first means on a tool to turn said device and a chordal slot in said head portion positioned below the top surface of said head portion to receive second means on said tool for retaining said device, said chordal slot being perpendicular to said diametral slot.

7. The device according to claim 6 wherein the bottom surface of said chordal slot lies in the same plane as the bottom surface of said diametral slot.

* * * * *